US008621046B2

(12) United States Patent
Hussain et al.

(10) Patent No.: US 8,621,046 B2
(45) Date of Patent: Dec. 31, 2013

(54) OFFLINE ADVERTISING SERVICES

(75) Inventors: Mahamood Hussain, Seattle, WA (US); Dennis Luo, Bellevue, WA (US); Krishnamurthy Sridharan, San Jose, CA (US); Dattatraya Kulkarni, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/647,463

(22) Filed: Dec. 26, 2009

(65) Prior Publication Data

US 2011/0161462 A1 Jun. 30, 2011

(51) Int. Cl.
*G06F 7/00* (2006.01)
*H04L 29/08* (2006.01)

(52) U.S. Cl.
CPC ..... *H04L 29/08072* (2013.01); *Y10S 707/9994* (2013.01)
USPC ........... 709/219; 709/201; 709/212; 709/213; 709/214; 709/215; 709/216; 709/217; 709/218; 709/224; 709/227; 709/228; 709/229; 709/231; 709/232; 709/245; 709/246; 709/236; 709/237; 709/238; 709/250; 707/705; 707/709; 707/758; 707/768; 707/781; 707/791; 707/802; 707/821; 707/822; 707/828; 707/999.01

(58) Field of Classification Search
USPC ......... 709/201, 217, 224, 227, 231, 250, 212, 709/213, 214, 215, 216, 218, 219, 228, 229, 709/232, 245, 246, 236, 237, 238; 707/705, 707/709, 758, 769, 781, 791, 802, 821, 822, 707/828, 999.01, 202, 10
See application file for complete search history.

(56) References Cited

U.S. PATENT DOCUMENTS

| 4,769,697 | A  | 9/1988  | Gilley et al.    |
| 5,515,098 | A  | 5/1996  | Carles           |
| 5,661,516 | A  | 8/1997  | Carles           |
| 5,911,773 | A  | 6/1999  | Mutsuga et al.   |
| 6,334,110 | B1 | 12/2001 | Walter et al.    |
| 6,401,034 | B1 | 6/2002  | Kaplan et al.    |
| 6,708,335 | B1 | 3/2004  | Ozer et al.      |
| 6,941,197 | B1 | 9/2005  | Murakami et al.  |
| 6,947,881 | B1 | 9/2005  | Murakami et al.  |

(Continued)

FOREIGN PATENT DOCUMENTS

| CN | 101159818 A | 4/2008  |
| CN | 102223393 A | 10/2011 |

(Continued)

OTHER PUBLICATIONS

Office Action Received for the Chinese patent application No. 201010621563.4, mailed on Mar. 1, 2012, 6 pages of Office Action and 6 pages of English translation.

(Continued)

*Primary Examiner* — Saket K Daftuar
(74) *Attorney, Agent, or Firm* — Caven & Aghevli LLC

(57) ABSTRACT

Methods and apparatus for provision of offline advertising services are described. In one embodiment, content data is stored in a local memory of a computing device prior to going offline. Once offline, the stored content is provided from the local memory, while the metrics regarding the provided content is collected and later transmitted to a remote server. Other embodiments are also described.

33 Claims, 7 Drawing Sheets

(56) References Cited

U.S. PATENT DOCUMENTS

| | | | |
|---|---|---|---|
| 7,134,130 B1 | 11/2006 | Thomas | |
| 7,363,151 B2 | 4/2008 | Nomura et al. | |
| 7,366,683 B2 * | 4/2008 | Altberg et al. | 705/14.64 |
| 7,457,828 B2 * | 11/2008 | Wenner et al. | 1/1 |
| 7,546,619 B2 | 6/2009 | Anderson et al. | |
| 7,567,800 B2 * | 7/2009 | Uematsu et al. | 455/414.3 |
| 7,636,785 B2 | 12/2009 | Shahine | |
| 7,657,626 B1 * | 2/2010 | Zwicky | 709/224 |
| 7,698,236 B2 | 4/2010 | Cox et al. | |
| 7,730,509 B2 | 6/2010 | Boulet et al. | |
| 7,778,987 B2 * | 8/2010 | Hawkins | 707/705 |
| 7,831,384 B2 | 11/2010 | Bill | |
| 7,835,859 B2 | 11/2010 | Bill | |
| 7,904,461 B2 | 3/2011 | Baluja et al. | |
| 7,974,873 B2 | 7/2011 | Simmons et al. | |
| 8,108,405 B2 | 1/2012 | Marvit et al. | |
| 2001/0049620 A1 | 12/2001 | Blasko | |
| 2001/0056461 A1 * | 12/2001 | Kampe et al. | 709/201 |
| 2002/0023002 A1 * | 2/2002 | Staehelin | 705/14 |
| 2002/0072952 A1 | 6/2002 | Hamzy et al. | |
| 2002/0078444 A1 | 6/2002 | Krewin et al. | |
| 2002/0129368 A1 | 9/2002 | Schlack et al. | |
| 2002/0174025 A1 | 11/2002 | Hind et al. | |
| 2003/0037333 A1 | 2/2003 | Ghashghai et al. | |
| 2003/0191812 A1 * | 10/2003 | Agarwalla et al. | 709/217 |
| 2004/0003392 A1 | 1/2004 | Trajkovic et al. | |
| 2004/0133923 A1 | 7/2004 | Watson et al. | |
| 2004/0240676 A1 | 12/2004 | Hashimoto et al. | |
| 2005/0097595 A1 | 5/2005 | Lipsanen et al. | |
| 2005/0160002 A1 | 7/2005 | Roetter et al. | |
| 2005/0216345 A1 * | 9/2005 | Altberg et al. | 705/14 |
| 2005/0283699 A1 | 12/2005 | Nomura et al. | |
| 2006/0015637 A1 * | 1/2006 | Chung | 709/232 |
| 2006/0090131 A1 | 4/2006 | Kumagai | |
| 2006/0106944 A1 | 5/2006 | Shahine et al. | |
| 2006/0241862 A1 | 10/2006 | Ichihara et al. | |
| 2006/0242315 A1 * | 10/2006 | Nichols | 709/231 |
| 2006/0253453 A1 * | 11/2006 | Chmaytelli et al. | 707/10 |
| 2006/0271425 A1 * | 11/2006 | Goodman et al. | 705/14 |
| 2007/0010942 A1 | 1/2007 | Bill | |
| 2007/0073477 A1 | 3/2007 | Krumm et al. | |
| 2007/0073682 A1 | 3/2007 | Adar et al. | |
| 2007/0088801 A1 * | 4/2007 | Levkovitz et al. | 709/217 |
| 2007/0121845 A1 * | 5/2007 | Altberg et al. | 379/114.13 |
| 2007/0157262 A1 | 7/2007 | Ramaswamy et al. | |
| 2007/0220010 A1 * | 9/2007 | Ertugrul | 707/10 |
| 2007/0226320 A1 * | 9/2007 | Hager et al. | 709/219 |
| 2007/0239527 A1 * | 10/2007 | Nazer et al. | 705/14 |
| 2007/0239533 A1 * | 10/2007 | Wojcicki et al. | 705/14 |
| 2007/0255617 A1 * | 11/2007 | Maurone et al. | 705/14 |
| 2007/0294773 A1 * | 12/2007 | Hydrie et al. | 726/27 |
| 2008/0021632 A1 | 1/2008 | Amano | |
| 2008/0027639 A1 | 1/2008 | Tryon | |
| 2008/0040370 A1 | 2/2008 | Bosworth et al. | |
| 2008/0040475 A1 | 2/2008 | Bosworth et al. | |
| 2008/0052168 A1 | 2/2008 | Peters et al. | |
| 2008/0086477 A1 * | 4/2008 | Hawkins | 707/10 |
| 2008/0097822 A1 | 4/2008 | Schigel et al. | |
| 2008/0104195 A1 * | 5/2008 | Hawkins et al. | 709/217 |
| 2008/0114651 A1 | 5/2008 | Jain et al. | |
| 2008/0120308 A1 | 5/2008 | Martinez et al. | |
| 2008/0162186 A1 | 7/2008 | Jones | |
| 2008/0187114 A1 * | 8/2008 | Altberg et al. | 379/93.12 |
| 2008/0222283 A1 * | 9/2008 | Ertugrul et al. | 709/224 |
| 2008/0235088 A1 * | 9/2008 | Weyer et al. | 705/14 |
| 2008/0235244 A1 | 9/2008 | Matsuo | |
| 2008/0306808 A1 | 12/2008 | Adjali et al. | |
| 2009/0049097 A1 * | 2/2009 | Nocifera et al. | 707/104.1 |
| 2009/0106415 A1 * | 4/2009 | Brezina et al. | 709/224 |
| 2009/0177528 A1 | 7/2009 | Wu et al. | |
| 2009/0204706 A1 * | 8/2009 | Ertugrul et al. | 709/224 |
| 2009/0216704 A1 | 8/2009 | Zheng et al. | |
| 2009/0240569 A1 * | 9/2009 | Ramer et al. | 705/10 |
| 2009/0307205 A1 | 12/2009 | Churchill et al. | |
| 2009/0327486 A1 * | 12/2009 | Andrews et al. | 709/224 |
| 2010/0031335 A1 | 2/2010 | Handler | |
| 2010/0042317 A1 | 2/2010 | Tajima et al. | |
| 2010/0049602 A1 | 2/2010 | Softky | |
| 2010/0063877 A1 * | 3/2010 | Soroca et al. | 705/14.45 |
| 2010/0076997 A1 | 3/2010 | Koike et al. | |
| 2010/0082432 A1 * | 4/2010 | Feng et al. | 705/14.53 |
| 2010/0094878 A1 * | 4/2010 | Soroca et al. | 707/748 |
| 2010/0106603 A1 | 4/2010 | Dey et al. | |
| 2010/0114864 A1 * | 5/2010 | Agam et al. | 707/709 |
| 2010/0161492 A1 | 6/2010 | Harvey et al. | |
| 2010/0250361 A1 * | 9/2010 | Torigoe et al. | 705/14.42 |
| 2010/0281042 A1 * | 11/2010 | Windes et al. | 707/756 |
| 2010/0293048 A1 * | 11/2010 | Singolda et al. | 705/14.43 |
| 2010/0299225 A1 | 11/2010 | Aami et al. | |
| 2011/0010433 A1 * | 1/2011 | Wilburn et al. | 709/219 |
| 2011/0106436 A1 | 5/2011 | Bill | |
| 2011/0154385 A1 | 6/2011 | Price et al. | |
| 2011/0246213 A1 | 10/2011 | Yarvis et al. | |
| 2011/0246214 A1 | 10/2011 | Yarvis et al. | |
| 2011/0246283 A1 | 10/2011 | Yarvis et al. | |
| 2011/0246300 A1 | 10/2011 | Yarvis et al. | |
| 2011/0246469 A1 | 10/2011 | Yarvis et al. | |
| 2011/0247029 A1 | 10/2011 | Yarvis et al. | |
| 2011/0247030 A1 | 10/2011 | Yarvis et al. | |
| 2011/0251788 A1 | 10/2011 | Yarvis et al. | |
| 2011/0251918 A1 | 10/2011 | Yarvis et al. | |
| 2011/0251990 A1 | 10/2011 | Yarvis et al. | |
| 2011/0258203 A1 | 10/2011 | Wouhaybi et al. | |
| 2011/0264553 A1 | 10/2011 | Yarvis et al. | |
| 2011/0264613 A1 | 10/2011 | Yarvis et al. | |
| 2011/0321073 A1 | 12/2011 | Yarvis et al. | |
| 2012/0011538 A1 | 1/2012 | Yarvis et al. | |
| 2012/0246000 A1 | 9/2012 | Yarvis et al. | |
| 2012/0246065 A1 | 9/2012 | Yarvis et al. | |
| 2012/0246684 A1 | 9/2012 | Yarvis et al. | |
| 2012/0253920 A1 | 10/2012 | Yarvis et al. | |

FOREIGN PATENT DOCUMENTS

| | | |
|---|---|---|
| CN | 102316364 A | 1/2012 |
| CN | 102612702 A | 7/2012 |
| EP | 1 217 560 A1 | 6/2006 |
| GB | 2481490 A | 12/2011 |
| JP | 2000-198412 A | 7/2000 |
| JP | 2006-333531 A | 12/2006 |
| JP | 2008-152564 A | 7/2008 |
| JP | 2008-236591 A | 10/2008 |
| JP | 2008546075 A | 12/2008 |
| JP | 2009-528639 A | 8/2009 |
| KR | 10-2002-0024645 A | 4/2002 |
| KR | 10-2006-0122372 A | 11/2006 |
| KR | 10-2006-0122375 A | 11/2006 |
| KR | 10-2007-0061601 A | 6/2007 |
| KR | 10-2009-0014846 A | 2/2009 |
| WO | 99/07148 A1 | 2/1999 |
| WO | 02/32136 A2 | 4/2002 |
| WO | 02/32136 A3 | 6/2002 |
| WO | 02/071298 A1 | 9/2002 |
| WO | 02/082214 A2 | 10/2002 |
| WO | 02/082214 A3 | 7/2004 |
| WO | 2006130258 A2 | 12/2006 |
| WO | 2007/101263 A2 | 9/2007 |
| WO | 2008/064071 A2 | 5/2008 |
| WO | 2006130258 A3 | 4/2009 |
| WO | 2009/099876 A2 | 8/2009 |
| WO | 2011/075119 A1 | 6/2011 |
| WO | 2011/075120 A1 | 6/2011 |
| WO | 2011/075137 A1 | 6/2011 |
| WO | 2011/130034 A2 | 10/2011 |
| WO | 2011/163411 A2 | 12/2011 |
| WO | 2012/006237 A2 | 1/2012 |
| WO | 2011/130034 A3 | 4/2012 |
| WO | 2011/163411 A3 | 4/2012 |
| WO | 2012/006237 A3 | 4/2012 |
| WO | 2012/135239 A2 | 10/2012 |
| WO | 2012/135239 A3 | 12/2012 |

(56) References Cited

FOREIGN PATENT DOCUMENTS

OTHER PUBLICATIONS

Office Action Received for the Japanese Patent Application No. 2010-274870, mailed on Apr. 3, 2012, 1 page of Office Action and 2 page of English Translation.
Office Action Received for European Patent Application No. 10252181.2, mailed on Jan. 9, 2012, 4 pages of Office Action.
European Search Report Received for European Patent Application No. 10252181.2, mailed on Dec. 23, 2011, 3 pages of EP Search Report.
International Search Report and Written Opinion Received for PCT Application No. PCT/US2009/068689, mailed on Aug. 26, 2010, 11 pages.
International Search Report and Written Opinion received for PCT Patent Application No. PCT/US2009/068131, mailed on Sep. 1, 2010, 9 pages.
International Search Report and Written Opinion received for PCT Patent Application No. PCT/US2009/068129, mailed on Aug. 31, 2010, 10 pages.
Office Action received for U.S. Appl. No. 13/129,968, mailed on Aug. 27, 2012, 19 pages.
Wikipedia, "Nielsen ratings", From Wikipedia, the free encyclopedia, retrieved on Feb. 1, 2013, 10 pages, webpage available at: http://en.wikipedia.org/wiki/Nielsen_ratings.
Schonfeld, "Google Now Lets You Target Ads At Yourself", TechCrunch, posted on Mar. 11, 2009, webpage available at: http://techcrunch.com/2009/03/11/google-now-lets-you-target-ads-at-yourself/, 2 pages.
Introducing Google TV, "Introducing Google TV", retrieved on Feb. 1, 2013, webpage available at: http://www.google.com/tv/.
Eloda Protocol, "Eloda Protocol Suite of Products", accessed on Aug. 17, 2011, 1 page, webpage available at: http://www.eloda.com/en/protocol/.
TRA, "TRA- The Right Audience", TRA, retrieved on Aug. 17, 2011, 1 page, webpage available at: http://www.traglobal.com/whatwedo.php.
Office Action received for U.S. Appl. No. 13/159,896, mailed on Sep. 19, 2012, 14 pages.
Office Action received for U.S. Appl. No. 13/159,894, mailed on Sep. 11, 2012, 13 pages.
International Search Report and Written Opinion received for International Patent Application No. PCT/US2011/042786, mailed on Feb. 23, 2012, 8 pages.
International Search Report and Written Opinion received for PCT Patent Application No. PCT/US2011/031064, mailed on Dec. 14, 2011,8 pages.
Combined Search and Examination Report received for United Kingdom Application No. 1108772.3, mailed on Sep. 26, 2011, 5 pages.
International Search Report and Written Opinion received for PCT Patent Application No. PCT/US2011/041516, mailed on Feb. 24, 2012, 7 pages.
International Search Report and Written Opinion International Search Report and Written Opinion for PCT Application No. PCT/US2011/049228, mailed on Mar. 27, 2012, 7 Pages.
International Preliminary Report on Patentability and Written Opinion received for PCT Patent Application No. PCT/US2009/068689, mailed on Jun. 28, 2012, 8 pages.
Office Action received for U.S. Appl. No. 13/159,874, mailed on Sep. 7, 2012, 14 pages.
Office Action received for U.S. Appl. No. 13/159,884, mailed on Aug. 27, 2012, 19 pages.
Office Action Received for the Chinese Patent Application No. 201010621563.4, mailed on Dec. 25, 2012, 8 pages of Office Action and 10 pages of English Translation.
International Preliminary Report on Patentability and Written Opinion received for PCT Patent Application No. PCT/US2011/031064, mailed on Oct. 26, 2012, 5 pages.
International Search Report and Written Opinion received for Patent Application No. PCT/US2012/030776, mailed on Oct. 29, 2012, 7 pages.
Office Action received for U.S. Appl. No. 13/078,565, mailed on Oct. 23, 2012, 17 pages.
Office Action received for Japanese Patent Application No. 2010-274870, mailed on Mar. 12, 2013, 2 pages of Office Action and 2 pages of English Translation.
Office Action received for U.S. Appl. No. 13/129,968, mailed on Apr. 4, 2013, 16 pages.
Office action Received for U.S. Appl. No. 13/159,894, mailed on Apr. 25,2013, 18 pages.
Office Action received for U.S. Appl. No. 13/159,884, mailed on May 13, 2013, 32 pages.
Office Action received for U.S. Appl. No. 13/159,874, mailed on Apr. 19, 2013, 33 pages.
Office action Received for U.S. Appl. No. 13/159,896, mailed on Apr. 24,2013, 12 pages.

* cited by examiner

OFFLINE ADVERTISING SERVICES

FIELD

The present disclosure generally relates to the field of computing. More particularly, an embodiment of the invention generally relates to techniques for provision of offline advertising services.

BACKGROUND

As the Internet is quickly becoming an integral part of everyday living, advertisements provided via the Internet has become a significant source of income for vendors that provide Internet-based services.

For example, Internet served advertisements that accompany applications (such as Gmail™) may not be served, viewed or measured when such applications are used in their offline mode. More specifically, Internet applications like Gmail™ may be accessed when the user is not connected to the Internet; however, Internet served advertisements that accompany such applications may not be served, viewed, or measured when such applications are used in their offline mode. This prevents Independent Software Vendors (ISVs) from being able to earn advertising revenue with their applications when such applications are accessed offline.

Accordingly, when a computing device is offline, advertising revenues may not be securely accounted for or realized.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
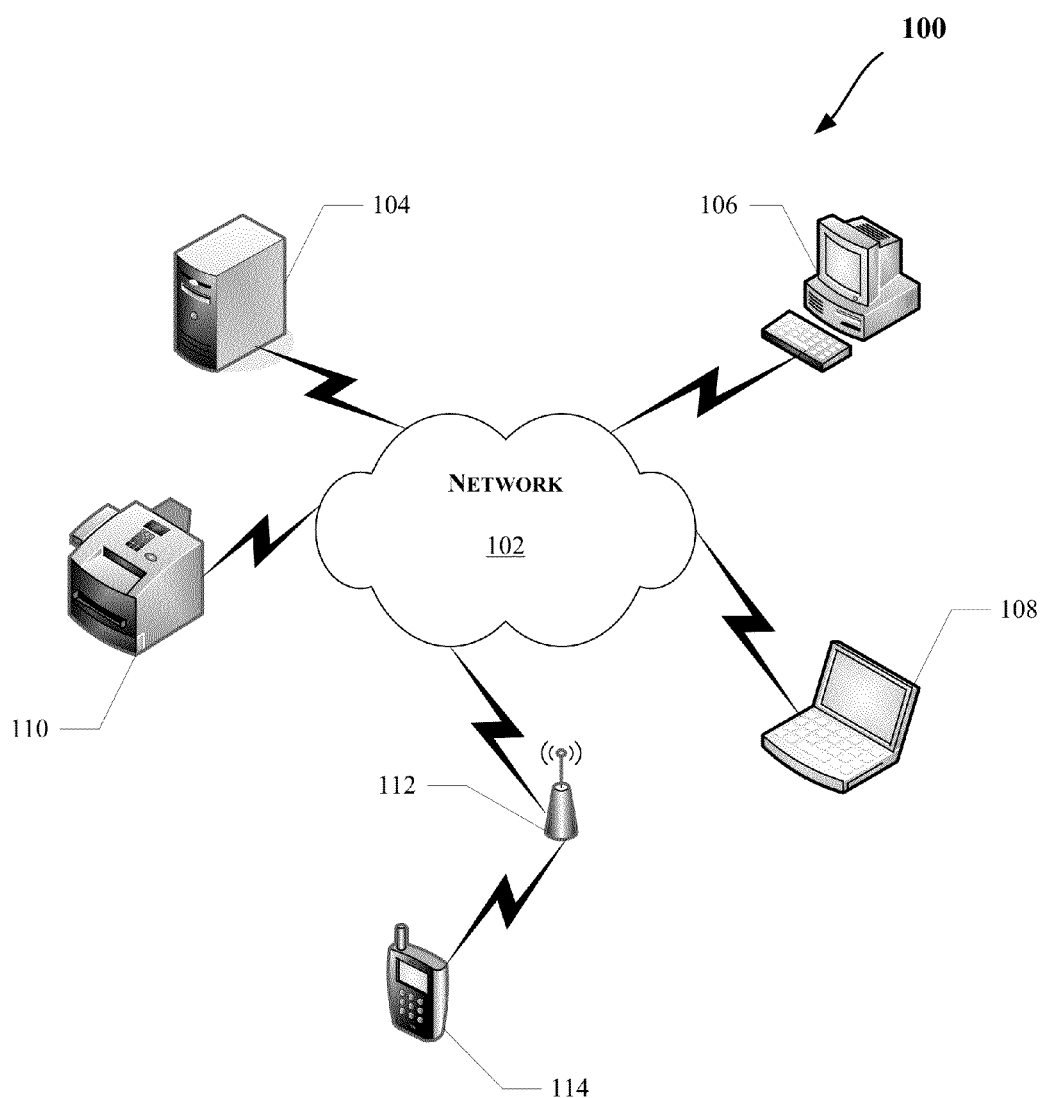
FIGS. 1-2, 4, and 7-8 illustrate block diagrams of embodiments of computing environment and systems, which may be utilized to implement some embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software (including for example micro-code that controls the operations of a processor), or some combination thereof.

Some of the embodiments discussed herein may allow for provision, realization, and/or secure accounting of offline user views, for example, where a computing device displaying advertising is not connected to any online services such as the Internet, Wide Area Network (WAN), etc. As discussed herein, reference to examples regarding advertisement or content deliver services is intended to also equally apply to any type of user views (e.g., associated with advertising, multimedia (e.g., audio, image, and/or video), parental control, etc. data). As discussed herein, "user views" may be interchangeable with user consumption of content and/or interaction with content.

In some current implementations, a user has to be connected to a server on-line to allow for one or more of: Delivery of ads, collection of interaction data, cycle/refresh ads, enforce advertiser targeting criteria, implement user privacy controls, and/or proper advertisement metric accounting. When a user goes off-line, however, the advertisement server has no way of tracking user views and metrics securely or other actions mentioned before. To this end, apparatus, method(s), and system(s) are provided to allow applications that work, at least partially, on a local computing device (e.g., without an Internet/intranet or other private/public WAN connection) to be able to securely display, authenticate, and/or verify that user views are not tampered, e.g., to avoid possible erroneous user view metrics reporting, malicious—either faked views by the user (vested interest), or by malicious software/malware/virus, etc. As will be further discussed herein, the local computing device may include a local memory (which may be any type of memory device such as those discussed herein with reference to FIGS. 1-8).

In one embodiment, images, video, audio, etc. are provided to the client 202 while offline (e.g., when dialup, Wireless Fidelity (WiFi), third generation partnership project (3G), etc. may be intermittent or temporarily unavailable). When the client goes back online, collected view analytic data or interaction data (e.g., user plays a game which is embedded into an Ad) are provided to an ad server and/or CDN for secure accounting. In an embodiment, a Trusted Platform Module (TPM) may be used to protect data and/or application execution related to user views on a local device while the device is offline. An embodiment provides a secure hardware environment for user view data and metric software to exist and to verify such data/application has not been compromised while the device is not connected to a network.

Various computing environments may be used to implement the embodiments discussed herein. For example, FIG. 1 illustrates various components of an embodiment of a networking environment 100, which may be utilized to implement various embodiments discussed herein. The environment 100 may include a network 102 to enable communication between various devices such as a server computer 104, a desktop computer 106 (e.g., a workstation or a desktop computer), a laptop (or notebook) computer 108, a reproduction device 110 (e.g., a network printer, copier, facsimile, scanner, all-in-one device, etc.), a wireless access point 112, a personal digital assistant or smart phone 114, a rack-mounted computing system (not shown), a set top box, a digital picture frame, an Ultra Mobile Device (UMD), etc. The network 102 may be any type of a computer network including an intranet, the Internet, and/or combinations thereof.

The devices 104-114 may be coupled to the network 102 through wired and/or wireless connections. Hence, the network 102 may be a wired and/or wireless network. For example, as illustrated in FIG. 1, the wireless access point 112 may be coupled to the network 102 to enable other wireless-capable devices (such as the device 114) to communicate with the network 102. In one embodiment, the wireless access point 112 may include traffic management capabilities. Also, data communicated between the devices 104-114 may be encrypted (or cryptographically secured), e.g., to limit unauthorized access. In addition the network coupling the devices may be composed of a combination of a data network, used to transmit information, and a control network, used to control simple attributes of devices, like power state.

The network 102 may utilize any type of communication protocol such as Ethernet, Fast Ethernet, Gigabit Ethernet, wide-area network (WAN), fiber distributed data interface (FDDI), Token Ring, leased line, analog modem, digital subscriber line (DSL and its varieties such as high bit-rate DSL (HDSL), integrated services digital network DSL (IDSL), etc.), asynchronous transfer mode (ATM), cable modem, and/or FireWire.

Wireless communication through the network 102 may be in accordance with one or more of the following: wireless local area network (WLAN), wireless wide area network (WWAN), code division multiple access (CDMA) cellular radiotelephone communication systems, global system for mobile communications (GSM) cellular radiotelephone systems, North American Digital Cellular (NADC) cellular radiotelephone systems, time division multiple access (TDMA) systems, extended TDMA (E-TDMA) cellular radiotelephone systems, third generation partnership project (3G) systems such as wide-band CDMA (WCDMA), etc. Moreover, network communication may be established by internal network interface devices (e.g., present within the same physical enclosure as a computing system) or external network interface devices (e.g., having a separate physical enclosure and/or power supply than the computing system to which it is coupled) such as a network interface card or controller (NIC).

In an embodiment, devices 106-110 may provide, realize, and/or securely account for offline user views, e.g., in accordance with local processing and/or at the direction of server 104, as is discussed herein, e.g., with reference to remaining figures.

In some embodiments, performing at least some user view related operations on a local device may allow for more precise targeting since user profile data may be securely present on the local device. On the contrary, other options such as using browser cache or perfecting before a user goes offline, may not dynamically target users, cycle advertisement inventory, or provide trusted and detailed ad performance data.

Figure 2:
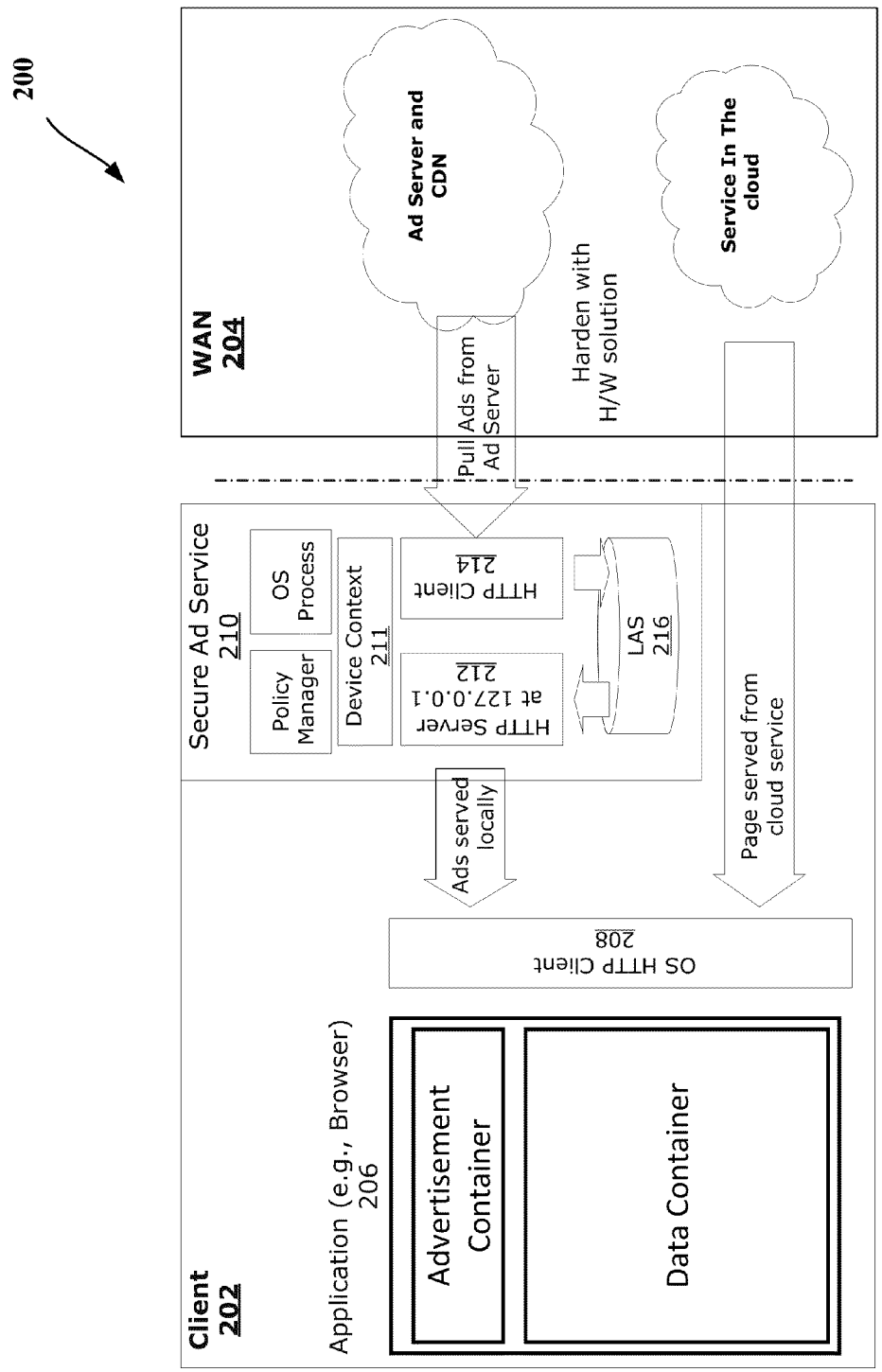

FIG. 2 illustrates a block diagram of a secure content delivery system 200 in accordance with an embodiment. As shown, system 200 includes a client 202 and a WAN 204. The client 202 may include various components such as an application 206 (e.g., to display or otherwise provide content to a user), an Operating System (OS) HTTP (HyperText Transfer Protocol) client 208 (e.g., to handle HTTP related operations such as receiving and transferring ads served locally and/or from a WAN server), and a secure ad/content service 210 (e.g., to provide ads/content when the client is offline). In some embodiments, the browser 206 may be capable of displaying images, text, and/or playing audio/video content. Application 206 may for example include applications that run outside of a browser, to browse online data or site specific browsers, e.g., as implemented in some browsers which may work offline but that may lack the ability to serve, cycle, measure ads when offline. In some embodiments, ad content, ad metrics, user profile and/or ad serving criteria may be secured.

The service 210 may include a policy manager, OS process, device context module 211, a local HTTP server 212 (e.g., at address 127.0.0.1, to provide ads/content to the browser 206), an HTTP client 214 (to couple with ad server(s) and/or Content Delivery/Distribution Networks (CDNs)), and a secure Local Ad/content Server (LAS) database 216.

As shown in FIG. 2, client 214 may store the ads/content pulled from ad servers and/or CDNs in the secure database 216 which is then retrieved by the server 212. The WAN 204 may include ad server(s), CDN(s), cloud service(s), etc. in various embodiments. The device context module 211 may provide for awareness of power, bandwidth, connectivity state, display capabilities, security options, etc. parameters associated with the client 202. Also, device context module 211 may be used to determine when to request ads from WAN 204 services/servers.

Figure 3:
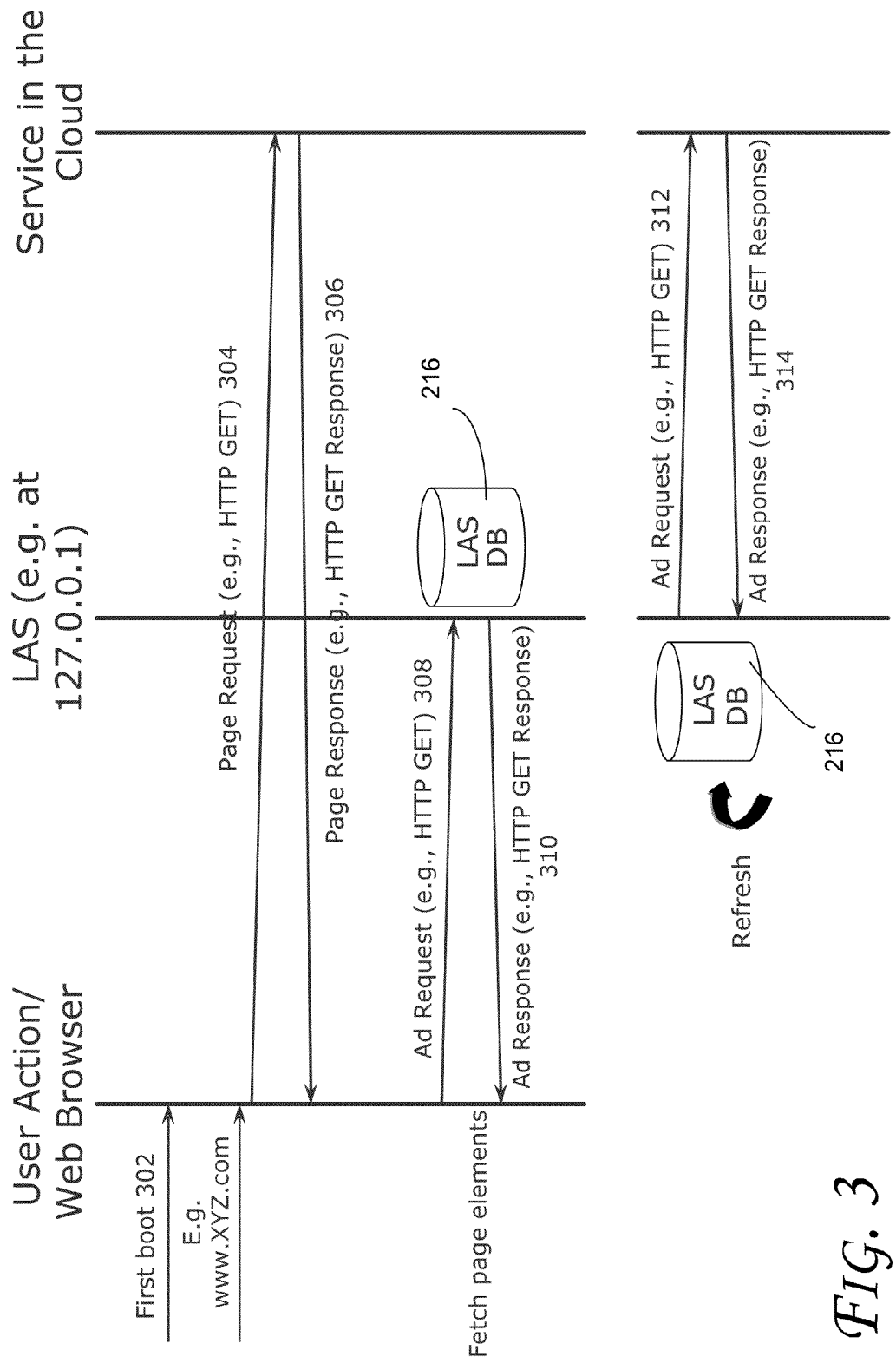
FIG. 3 illustrates a flow diagram according to an embodiment of the invention.

FIG. 3 illustrates a flow diagram of operations corresponding to secure provision of ad/content, according to an embodiment. As shown in FIG. 3, operations with respect to user action/web browser (e.g., at the client 202 of FIG. 2), at Local Ad Server (LAS) (which may be a server providing any type of content as discussed herein), and services in the cloud (e.g., performed at WAN 204 of FIG. 2) are discussed. Furthermore, even though some embodiments discussed herein reference HTTP, these references are only exemplary and the embodiments may be practiced without using HTTP, or by using other types of protocols.

As shown, a client may first boot 302 (e.g., by setting up an account, enroll publishers or ad networks, and/or provide profile information which may be used to initialize the device context 211), and then send a page request 304 to a service (e.g., http://www.xyz.com) via LAS (which in an embodiment may be the OS HTTP client 208 of FIG. 2). The service may respond 306 and the responses may be either directly delivered to the browser or stored in the database 216 of FIG. 2, for example. Operations 302-306 may be performed while the client 202 is online. Once the network connection becomes unavailable or unstable (e.g., with periodic disconnections) page elements may be fetched 308-310 by the user/browser from a local ad server (e.g., such as the database 216 of FIG. 2). As also shown, the LAS 216 may be refreshed 312-314 (e.g., by prefetching or updating previously fetched) data from the cloud once the client network connection is reestablished.

In one embodiment, ads may be periodically fetched from an ad server. For example (e.g., as a default option in an embodiment), pre-fetch may be performed asynchronously based on user profile (and subsequently served when offline). Also (e.g., as an opt-out option in an embodiment), ad/content may be fetched when a user visits an online property (e.g., fetch when online and serve when offline). As previously discussed, the ads may be stored in a local database (e.g., database 216). Also, while offline, ad servicing/metrics from the local database may be securely tracked and stored and subsequently uploaded to ad/content servers once online, e.g., based on network connection status.

In an embodiment, a secured database may be used for storing Ad metrics, user profile, and advertiser criteria at the client. This security can be provided through several options, such as encryption, authentication, and combinations thereof. Furthermore, the ads displayed while offline may be cycled by implementing advertiser frequency capping, TTL (Time To Live), etc. policies.

In some embodiments, processor utilization at the client device may be monitored (e.g., over some recent history), along with memory page faults, or other memory load/access (e.g., over some recent history) and used as parameters when determining network availability, device availability, and/or user preferences over a period of time to determine the best time window to interact with the service in the cloud. Each of the three criteria may be clusters of variables like bandwidth, latency for network, processor, memory, etc. for device and time of day and other self expressed data for user preferences.

Figure 4:
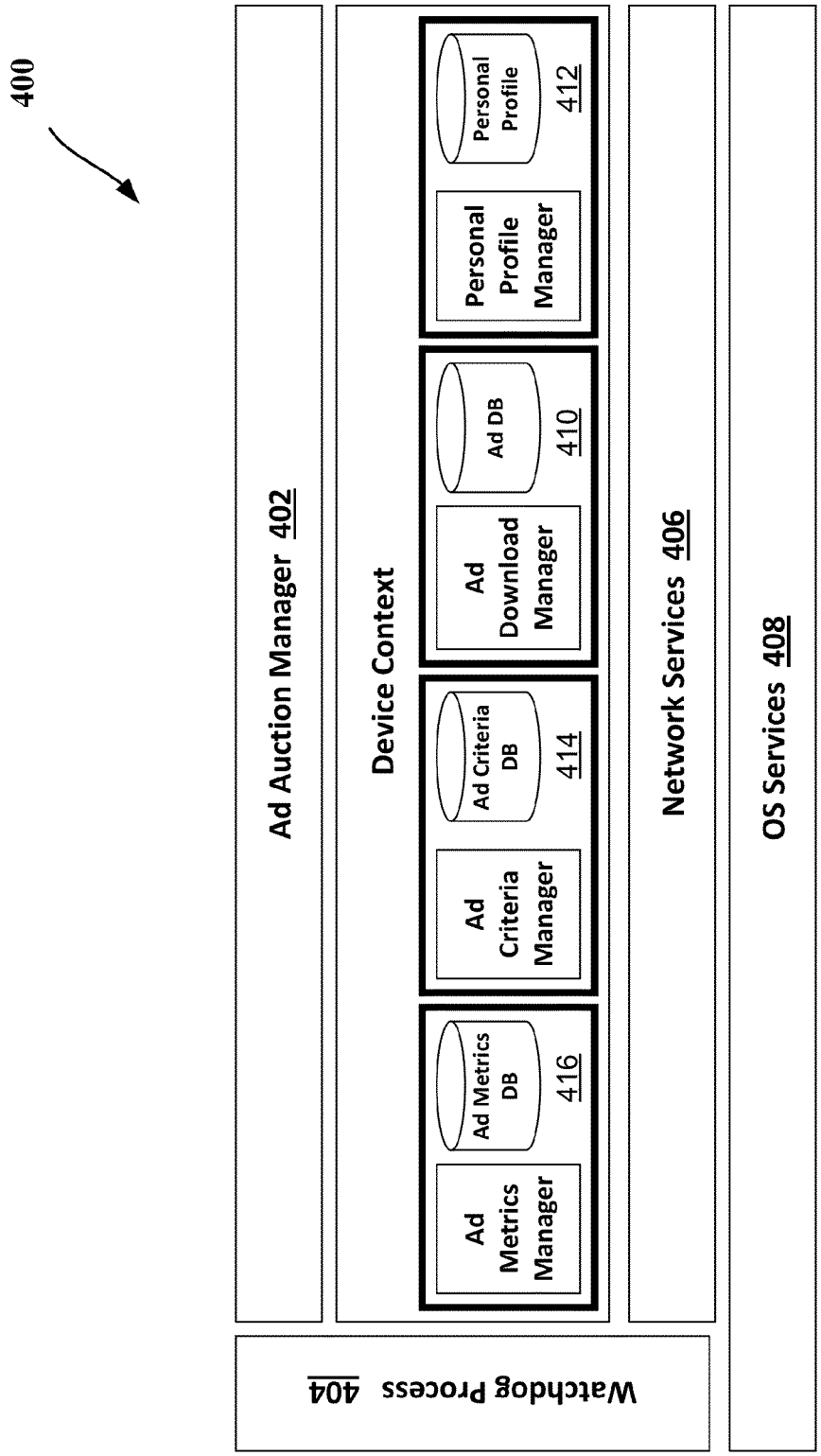

FIG. 4 illustrates a block diagram of an ad/content delivery auction management system in accordance with an embodiment. As shown, system 400 includes an ad auction manager (e.g., to manage an auction for ads/content as further discussed herein below), the device context module 211, a watchdog process (e.g., to provide one or more of: 1. process security against malicious/accidental removal of offline service from device; 2. monitors network, device, etc. for changes; 3. invokes metrics manager, criteria manager, etc. periodically to perform administrative tasks including, for example, logging ad performance data, pruning ad elements, refreshing Ad DB, etc.), network service(s) 406, and OS service(s) 408 (e.g., to provide OS related services such as discussed herein).

In an embodiment, the network service(s) 406 are implemented by the OS and/or drivers provided by the hardware on the client system. Network services may provide access to granular information on the state of the network connection including connection state, bandwidth consumed and available, and/or other network parameters. For example, a polling and/or a notification method to determine the status of the network connection may be implemented. This interface may be implemented with available APIs (Application Programming Interfaces) with the networking hardware driver or proprietary programming interfaces. The bandwidth consumption on the available network connection(s) may be monitored (e.g., based on historic data in an embodiment) as one of the inputs to determine the best time window to request advertising elements from the Ad server or upload locally collected metrics to the Ad server (e.g., when bandwidth consumption is reduced).

Referring to FIG. 4, an ad download manager 410 may utilize the following context information to determine the best time window to download advertising elements from the Ad server:
  (1) Device context: The device context may be a set of API's (e.g., implemented on Intel® Architecture (IA) hardware) that provide information on several parameters relating to the client that may change over time, e.g., depending on processor utilization, network factors, etc. The reported context may include awareness of power, battery state, bandwidth, connectivity state, display, security, etc.
  (2) Personal profile: A Personal Profile Manager 412 may export several parameters that the Ad Download Manager 410 uses to determine the best window to download Ad elements.
  (3) Network context: The network context may define parameters like network availability (which may be implemented in one embodiment as a network ping), user preferences (e.g., time of day based controls), device capabilities (e.g., nature of physical connection, load factors etc) and/or network partner characteristics. These parameters may be tracked over one or more time windows.

Regardless of whether the user opts out of offline ad provision, advertisements may still be stored in a local database on the client in an embodiment. This may be implemented as hardware secured or unsecured database on available forms of storage (e.g., Solid State Drive (SSD) or Hard Disk Drive (HDD)). The database may be segmented by partner publisher, web property and advertising elements.

The ad database may store the following in an embodiment:
  (a) Ad creatives downloaded from ad server/CDN; and/or
  (b) Serving priority information. This may be expressed as preference/priority rules matrix for Ad elements. The rules matrix may be implemented as a weighted priority per Ad creative. Rules may be used to change weights of the Ad elements, e.g., Rule (If time of day is between 19:00-23:00, then weight Ad element ref#xyz123 by 1.5×). Rules can also determine Time To Live of the Ad creatives among other advertiser criteria.

Personal Profile Manager 412 may be implemented as an opt out mechanism (e.g., user is opted in by default) and mechanisms may be provided to the user to opt-out. In an embodiment, opt-out may be provided at the following two levels:
  a. Service Opt-Out—User has the option to completely opt out of the advertising service. This may be implemented through BIOS (Basic Input/Output System), OS or application level controls that are accessible to and may be manipulated by the user.
  b. Publisher Opt-Out—The user has the option of opting out of the service for a particular publisher.

The user profile information may be collected and managed in a secured database. In some embodiments, some additional components of the personal profile may include:
  (1) Application Usage History
    a. Track usage of partner application on client
    b. Application may be stand-alone or hosted within browser
    c. Gather interaction data on the aggregate—number of hours spent, time of day, location of application usage
  (2) Personal Profile Information
    a. Self expressed data
    b. Location data etc.
  (3) System Usage History
    a. System on-off time periods
    b. Network availability
    c. Peak and off-peak usage An ad criteria manager 414 may perform one or more of the following:
  (1) request for advertiser targeting criteria from ad server
  (2) maintain targeting criteria database for each ad element, and/or for each partner
  (3) advertiser frequency capping criteria. This may be expressed as maximum number of exposures per user, maximum number of exposures per ad element, etc.
  (4) may or may not be a secured database In an embodiment, an ad fetching mechanism may be implemented as an opt-out model where advertisements are pre-fetched from the ad server. If the user opts-out of offline ad provision, then the advertisements are cached only when the user visits the web property.

An ad metrics manager 416 may perform one or more of the following:
  a. keep track of advertisements served on the client when user is offline (e.g., per partner, per property, etc.)
  b. create secured data packet for transmission to ad server once online
  c. interacts with the network services layer (e.g., services 406) to determine the best time window to upload locally collected metrics to the ad server.

In some embodiments, choosing the advertisement to be displayed may be done by intersecting three criteria:
  1. The advertisers targeting criteria
  2. The user's profile information
  3. The browsing context at the time a request to the ad network is made When the user is offline, criteria 3 above may not be met since the client is not reachable by the ad server and the Ad server may not determine when the user may go offline. When the client is offline, the client and the ad sever may split the targeting work load in order to ensure user profile privacy/protection. In an embodiment, this may be implemented as follows:

a. Create basic, non-PII profile: The actual, full user profile remains protected on the client and an abbreviated profile without any Personally Identifiable Information (PII) is created and sent to the ad server (e.g., gender, age, location).

b. Advertiser criteria: The ad server may use this information to intersect with the advertiser criteria and determine one or several advertiser matches. This information may be sent back to the client.

c. Ad serving priority: In case of more than one ad creative, rules that allow for determining which ad creative to pick for serving to the client d. Run targeting algorithm. The client may use this information in conjunction with the full profile to refine the advertiser-user matches.

e. Request ad element(s): Using the refined targeting information, the client requests for one or more ad elements from the ad server (e.g., may be redirected to the ad content server at this point of time)

In some embodiments, when the user opts out of offline ad provision, the client may not create or store any profile information. No behavioral ad targeting may be carried out on the client. This, however, may not preclude behavioral targeting by the ad server. Separate mechanisms for opting out of behavioral targeting by the ad server may or may not exist.

Figure 5:
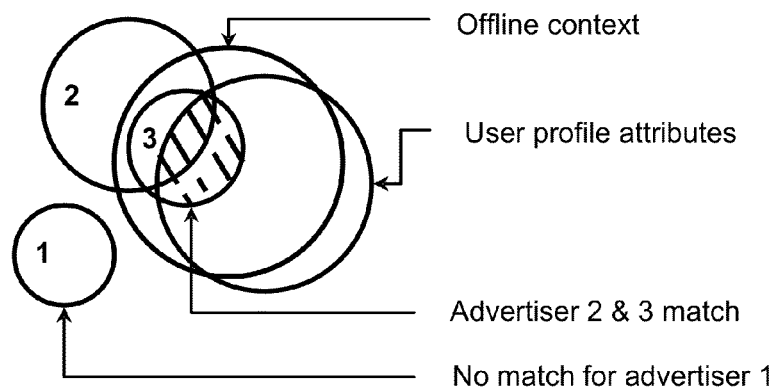
FIG. 5 illustrates a Venn diagram according to an embodiment.

FIG. 5 illustrates a Venn diagram for an auction manager according to an embodiment. As shown, offline context, user profile attribute(s), advertiser matches, etc. may be taken into account when deciding which ad/content to provision to the client. Offline Context may include: (a) time of day when offline; (b) property visited (e.g., partner or non-partner site); and/or (c) local context information available on client (such as power state, security software status, etc.).

In some embodiments, auctions may be run at two levels: (a) Pre-roll auction with bare-bones, non-PII user profile; and (b) Full-roll auction with full user profile, advertiser criteria and offline context.

In an embodiment, a time window is defined as a discrete, continuous period of time measured at equal intervals of real time. The duration of a time window is defined by a policy and could thus be one second long or one minute long or any other policy defined real time length.

In some embodiments, three clusters of elements may be defined for the three types of input elements—User cluster, Publisher/Property cluster and Algorithm cluster. Each cluster is assigned a unique weighting factor that is defined by a policy and contains its own, unique set of elements. Each element within a cluster is assigned a score between 0-10 based on some computation. The final publisher score evaluates to a value between 0-1 and is determined by:

Publisher/property score=(User cluster weight×ΣElement scores)+(Publisher cluster weight×ΣElement scores)+(Algorithm cluster weight×ΣElement scores)

A higher score indicates higher preference for requesting that publishers ad elements from the ad server. At the end of the prioritizing exercise, the publisher/property that has the highest score is chosen as the winner and provides the ads to the client.

The user cluster groups all elements that are dependent on user behavior, including but not limited to, probability of user visiting a publishers web property (P(visit)), ad interaction time and time spent. More particularly, each element may have its own bounds of operation and its own units, e.g., time spent element is a discrete integer and denominated in 'time windows'. Probability of visiting the property is a real number between 0 & 1. In one embodiment, in order to be able to sum up elements within their cluster, each element may be normalized on a unit-less scale of 0-1. Moreover, a user cluster may group all elements that are dependent on user behavior, including for example, interaction time, time spend, P(Visit), etc. P(Visit) defines the probability that the user will visit the web property in the current time window and is a real number between 0 & 1. This can be determined by using a Bayesian Inference model where historical evidence of visits to the web property is maintained (see, e.g., FIG. 6, where "x" indicates no visit and "√" indicates a visit). This evidence is used to recalculate P(Visit) at the current time window.

Figure 6:
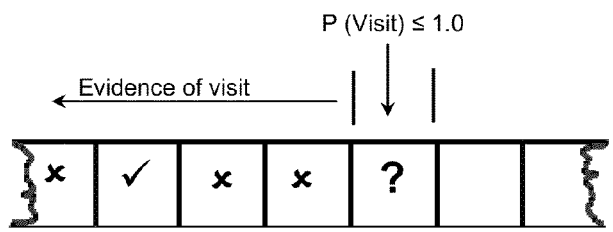
FIGS. 6 and 6A illustrate block diagrams, according to some embodiments.
Figure 6A:
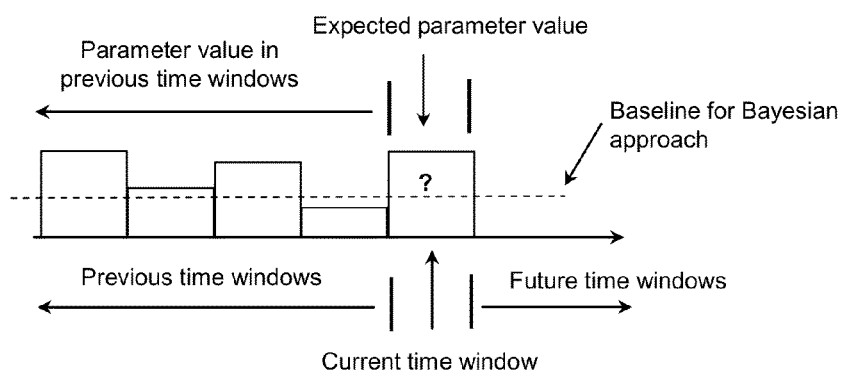

Time Spent on property defines the amount of time a user spends on the partner web property and is expressed in real time per time window, e.g., user spent 20% of the time window on the partner property. Thus it is a real number between 0 and 1. Expected time spent in the current time window could simply be the running average of previous 'n' window times or could be expressed as a probability of the user spending more than a baseline fraction of time. This probability can be determined by using a Bayesian Inference model where historical evidence of times spent above or below baseline is maintained. This evidence is used to recalculate P(Time spent>Baseline) at the current time window. Referring to FIG. 6A, which graphically illustrates tracking parameter value(s) over one or more time windows and using the historical values to predict value of a parameter in the current time window. In an embodiment, a baseline parameter value may be maintained to determine if the parameter value in each time windows is above or below this baseline value.

Ad element exposure time defines the amount of time all ad elements from a partner publisher were exposed to the user and is expressed in real time per time window, e.g., user spent 20% of the time window on the partner property. Thus it is a real number between 0 and 1. The expected exposure time at the current time window is calculated using the running average or Bayesian approach similar to the 'time spent on property' approach above.

A publisher/property cluster may group all elements that are dependent on the publisher/web property, including element size, priority, expired elements, server response time, etc. Element size may the average size of all advertising elements fetched from the ad server in a single transaction. This could be maintained as a running average of the past 'n' transactions with the ad server and is a real number between 0 and the maximum allowed payload by the underlying transport mechanism. Server response time may define the expected response time of the ad sever to a request for ad elements and is expressed in real time units. The expected server response time at the current time window is calculated using the running average or Bayesian approach similar to the 'time spent on property' approach above. A policy decision needs to be made to prioritize ad servers with larger response times or to prioritize ad servers with lower response times. Accordingly, the expected server response time may be normalized as follows:

a. Policy: Prioritize larger response times
   Response time=Max allowed TTL by underlying transport maps to a value of 10 on the normalized scale
   b. Policy: Prioritize smaller response times
   Response time=Max allowed TTL by underlying transport maps to a value of 0 on the normalized scale Publisher priority may define the importance of the Intel-publisher relationship and is policy driven. This is expressed as an integer between 0-10 with 10 indicating highest priority and 0 indicating lowest priority. Expired elements may define the proportion of ad elements that have expired before being refreshed and is expressed as a proportion of expired to total ad elements for the publisher and is thus a real number between 0 and 1, with 0 indicating no expired ad elements and 1 indicating all ad elements have expired. Ad element expiry policy is defined by the advertiser.

An algorithm cluster may group all elements that influence the outcome of the results due to the nature of the ranking algorithm, e.g., including number of times selected. Number of times selected may define the number of times ad elements have been requested in the past 'n' time windows. It is conceivable that factors like excessive user activity on a particular site or very fast ad server repeatedly prioritizes one (or a small set of) ad server(s) and ad elements from other partner publishers never get downloaded. To avoid this situation, publishers/properties that have not been selected for download are prioritized over those that have already been selected for download. This is expressed as an integer between 0 (never selected) and 'n' (always selected) with 'n' indicating the number of time windows for which the history is being tracked. Num. times selected is normalized as: (a) 0 maps to 10 on the normalized scale; and (b) 'n' maps to 0 on the normalized scale.

In an embodiment, "stale" Ads may be deleted from the database, e.g., on a timed (periodic) removal or based on response received from ad server (indicating to remove certain or all or old ad elements—'Old' as defined by policy). Also, in one embodiment, a partial auction may be performed, e.g., to determine one or more advertisers who will later participate in a full auction. In an embodiment, winners of partial auction may have equal probability of being selected before going into full auction. A full auction may select an ad element to be displayed on publisher site when accessed by the user.

Moreover, network status may be taken into account to determine whether to request ad elements from an ad server. For example three clusters may be composed of input elements—user preferences, device capabilities and partner (over network) characteristics. Each cluster may be assigned a unique weighting factor that is defined by a policy and contains its own, unique set of elements. Each element within a cluster may be assigned a score between 0-10 based on some computation. Moreover, in order to be able to sum up elements within their cluster, each element may be normalized on a unit-less scale of 0-10. Network availability may be defined as a Boolean variable, e.g., 1: Network services available; 0: Network services not available. This could be implemented as a ping to the ad server, where ping response failure evaluates to 0 and ping success evaluates to 1. Network availability is not normalized. The user preferences cluster may define users' self-expressed preferences (e.g., don't connect between 6 pm-10 pm—Time of Day control, don't connect over a tethered connection like when using a cell phone connected to the PC to access the network on the PC, etc.). The device capabilities cluster may define capabilities/limitations of the device, for example, (a) static properties such as type of network, type of physical link, etc. (although they may change from time to time, e.g., when a user switches from a LAN connection to a WiFi network); and (b) dynamic properties such as (average) bandwidth used/available over time windows, device load that could in turn be measured as: processor utilization, memory load (number of page faults), disk load (number of reads or writes), etc.

The partner (over network) characteristics cluster may define partner characteristics such as publisher priority (a function of relationship between a managing entity and the partner), response time (which could be determined from ping response latency or dynamically tracked as ad elements are requested). A go/no go score may evaluate based on a value between 0-1. Compute score as:

Go No-Go Score=Network Availability*(User preferences. cluster weight×ΣElement scores)+(Device capabilities cluster weight×ΣElement scores)+ (Partner characteristics cluster weight×ΣElement Scores)

A threshold could be a 2-level threshold that when reached indicates a 'Go' decision and a minimum level is passed on the way down indicates a 'No go' decision. For example, let upper and lower thresholds be T(max) and T(min) respectively, where 0<T(min)<T(max)<1. If T(min)<='Go No-Go Score'<=T(max) then the decision is a 'Go'. If the 'Go No-Go Score' is rising (Value in previous time window<value in current time window) AND the score is greater than T(min), then the decision is a 'Go'. If the 'Go No-Go Score' is falling (Value in previous time window>value in current time window) AND the score is lesser than T(min), then the decision is a 'No Go'.

Figure 7:
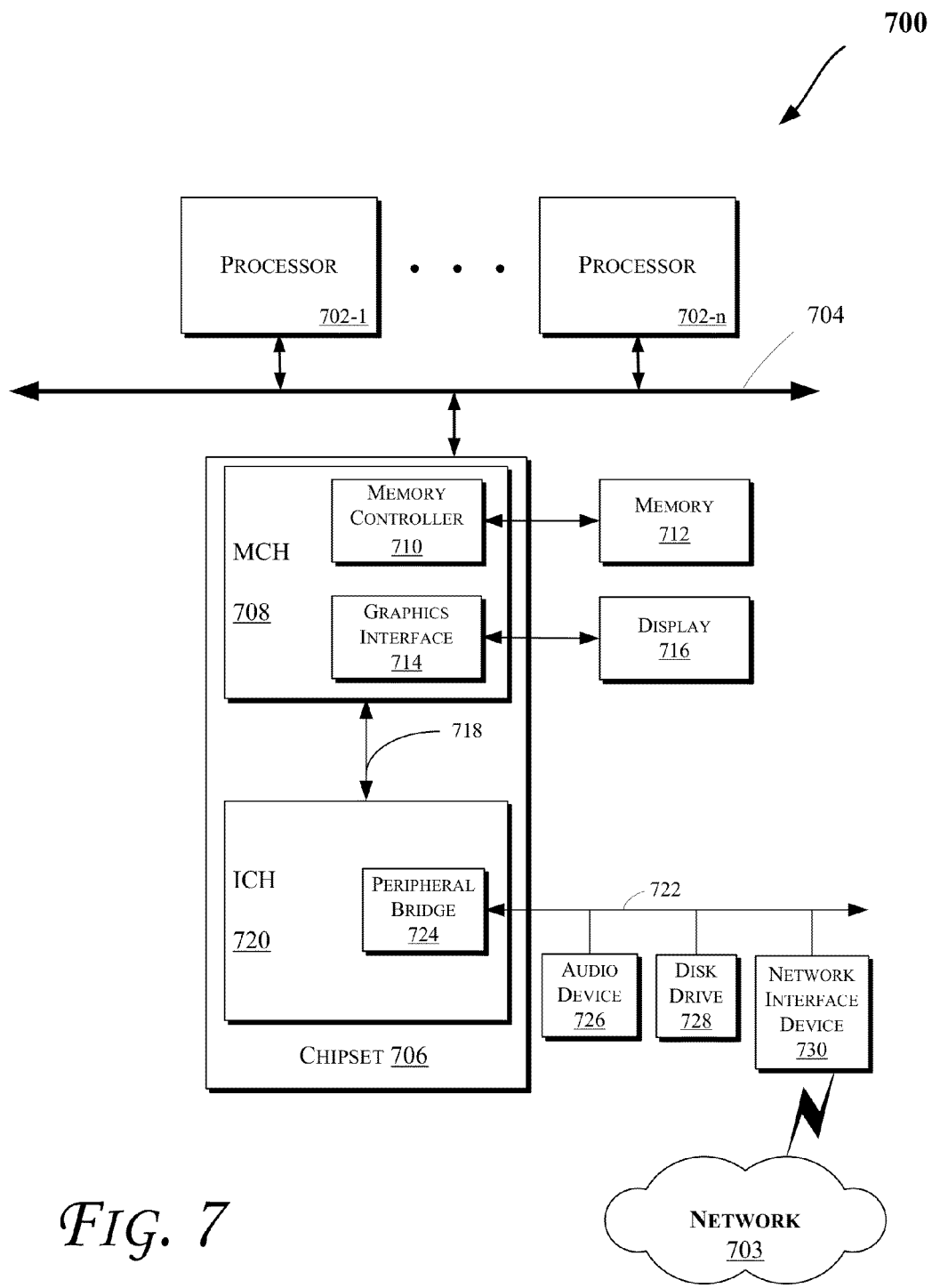

FIG. 7 illustrates a block diagram of an embodiment of a computing system 700. In various embodiments, one or more of the components of the system 700 may be provided in various electronic devices capable of performing one or more of the operations discussed herein with reference to some embodiments of the invention. For example, one or more of the components of the system 700 may be used to perform the operations discussed with reference to FIGS. 1-6 and/or one or more devices discussed with reference to FIGS. 1-6 may include one or more components of FIG. 7.

Moreover, the computing system 700 may include one or more central processing unit(s) (CPUs) 702 or processors that communicate via an interconnection network (or bus) 704. The processors 702 may include a general purpose processor, a network processor (that processes data communicated over a computer network 703 which may be the same or similar to network 102 of FIG. 1), or other types of a processor (including a reduced instruction set computer (RISC) processor or a complex instruction set computer (CISC)). Moreover, the processors 702 may have a single or multiple core design. The processors 702 with a multiple core design may integrate different types of processor cores on the same integrated circuit (IC) die. Also, the processors 702 with a multiple core design may be implemented as symmetrical or asymmetrical multiprocessors. Additionally, the processors 702 may utilize an SIMD architecture.

A chipset 706 may also communicate with the interconnection network 704. The chipset 706 may include a memory control hub (MCH) 708. The MCH 708 may include a memory controller 710 that communicates with a memory 712. The memory 712 may store data, including sequences of instructions that are executed by the CPU 702, or any other device included in the computing system 700. In one embodiment of the invention, the memory 712 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 704, such as multiple CPUs and/or multiple system memories.

The MCH 708 may also include a graphics interface 714 that communicates with a display 716. The display 716 may be used to show a user results of operations associated with the Brownian Bridge algorithm discussed herein. In one embodiment of the invention, the graphics interface 714 may communicate with the display 716 via an accelerated graphics port (AGP). In an embodiment of the invention, the display 716 may be a flat panel display that communicates with the graphics interface 714 through, for example, a signal converter that translates a digital representation of an image stored in a storage device such as video memory or system memory into display signals that are interpreted and displayed by the display 716. The display signals produced by the interface 714 may pass through various control devices before being interpreted by and subsequently displayed on the display 716.

A hub interface 718 may allow the MCH 708 and an input/output control hub (ICH) 720 to communicate. The ICH 720 may provide an interface to I/O devices that communicate with the computing system 700. The ICH 720 may communicate with a bus 722 through a peripheral bridge (or controller) 724, such as a peripheral component interconnect (PCI) bridge, a universal serial bus (USB) controller, or other types of peripheral bridges or controllers. The bridge 724 may provide a data path between the CPU 702 and peripheral devices. Other types of topologies may be utilized. Also, multiple buses may communicate with the ICH 720, e.g., through multiple bridges or controllers. Moreover, other peripherals in communication with the ICH 720 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 722 may communicate with an audio device 726, one or more disk drive(s) 728, and a network interface device 730, which may be in communication with the computer network 703. In an embodiment, the device 730 may be a NIC capable of wireless communication. Other devices may communicate via the bus 722. Also, various components (such as the network interface device 730) may communicate with the MCH 708 in some embodiments of the invention. In addition, the processor 702 and the MCH 708 (or one or more of MCH's components) may be combined to form a single chip. Furthermore, the graphics interface 714 may be included within the MCH 708 in other embodiments of the invention.

Furthermore, the computing system 700 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 728), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 700 may be arranged in a point-to-point (PtP) configuration such as discussed with reference to FIG. 8. For example, processors, memory, and/or input/output devices may be interconnected by a number of point-to-point interfaces.

Figure 8:
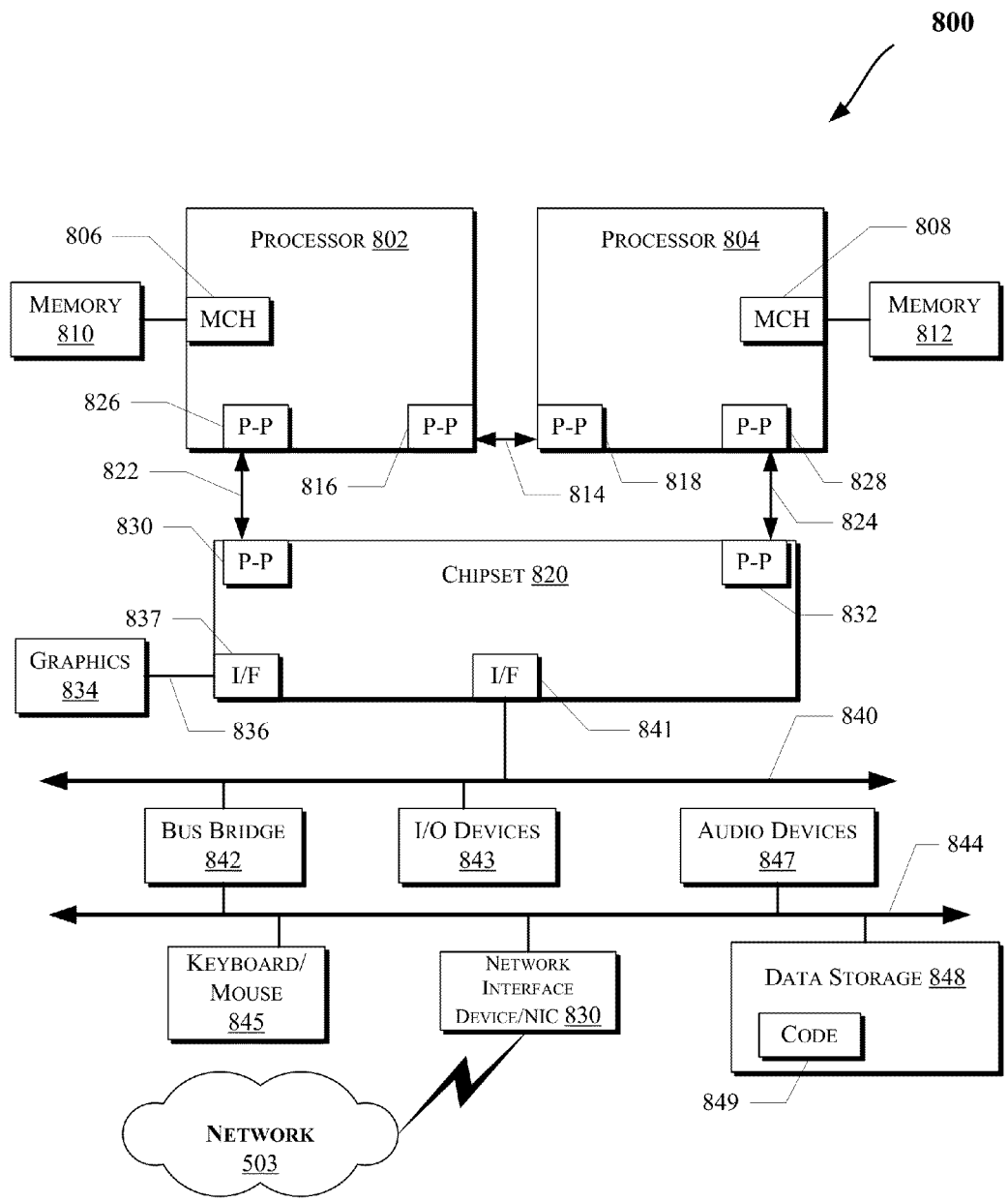

More specifically, FIG. 8 illustrates a computing system 800 that is arranged in a point-to-point (PtP) configuration, according to an embodiment of the invention. In particular, FIG. 8 shows a system where processors, memory, and input/output devices are interconnected by a number of point-to-point interfaces. The operations discussed with reference to FIGS. 1-7 may be performed by one or more components of the system 800.

As illustrated in FIG. 8, the system 800 may include several processors, of which only two, processors 802 and 804 are shown for clarity. The processors 802 and 804 may each include a local memory controller hub (MCH) 806 and 808 to couple with memories 810 and 812. The memories 810 and/or 812 may store various data such as those discussed with reference to the memory 712 of FIG. 7.

The processors 802 and 804 may be any suitable processor such as those discussed with reference to the processors 702 of FIG. 7. The processors 802 and 804 may exchange data via a point-to-point (PtP) interface 814 using PtP interface circuits 816 and 818, respectively. The processors 802 and 804 may each exchange data with a chipset 820 via individual PtP interfaces 822 and 824 using point to point interface circuits 826, 828, 830, and 832. The chipset 820 may also exchange data with a high-performance graphics circuit 834 via a high-performance graphics interface 836, using a PtP interface circuit 837.

At least one embodiment of the invention may be provided by utilizing the processors 802 and 804. For example, the processors 802 and/or 804 may perform one or more of the operations of FIGS. 1-7. Other embodiments of the invention, however, may exist in other circuits, logic units, or devices within the system 800 of FIG. 8. Furthermore, other embodiments of the invention may be distributed throughout several circuits, logic units, or devices illustrated in FIG. 8.

The chipset 820 may be coupled to a bus 840 using a PtP interface circuit 841. The bus 840 may have one or more devices coupled to it, such as a bus bridge 842 and I/O devices 843. Via a bus 844, the bus bridge 843 may be coupled to other devices such as a keyboard/mouse 845, the network interface device 830 discussed with reference to FIG. 8 (such as modems, network interface cards (NICs), or the like that may be coupled to the computer network 703), audio I/O device, and/or a data storage device 848. The data storage device 848 may store code 849 that may be executed by the processors 802 and/or 804.

In various embodiments of the invention, the operations discussed herein, e.g., with reference to FIGS. 1-8, may be implemented as hardware (e.g., logic circuitry), software (including, for example, micro-code that controls the operations of a processor such as the processors discussed herein), firmware, or combinations thereof, which may be provided as a computer program product, e.g., including a tangible machine-readable or computer-readable medium having stored thereon instructions (or software procedures) used to program a computer (e.g., a processor or other logic of a computing device) to perform an operation discussed herein. The machine-readable medium may include any storage device such as those discussed herein.

Additionally, such tangible computer-readable media may be downloaded as a computer program product, wherein the program may be transferred from a remote computer (e.g., a server) to a requesting computer (e.g., a client) by way of data signals transferred via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A method comprising:
    determining whether to store content data from a remote content server in a local memory of a computing device in response to a determination that the computing device has an active coupling with the remote content server and context information of the computing device, wherein the context information is to indicate processor utilization and power state;
    storing the content data in the local memory of the computing device if it is determined to store the content data from the remote content server; and
    in response to a detection that the active coupling with the remote content server has become unavailable, providing a portion of the stored content data to an output device of the computing device,
    wherein determining whether to store the content data is performed based on an item selected from a list consisting of: a user cluster, an algorithm cluster, and a publisher/property cluster,
    wherein each cluster is assigned a unique weighting factor that is defined by a policy and contains its own unique set of elements,
    wherein determining whether to store the content data is performed based on the publisher/property cluster,
    wherein the publisher/property cluster is to group one or more elements that are dependent on a web property,
    wherein the one or more elements comprise a server response time element corresponding to an expected response time of the remote content server to a request for one or more portions of the content data.

2. The method of claim 1, wherein determining whether to store the content data is performed based on client profile data corresponding to the computing device and a publisher.

3. The method of claim 2, further comprising generating the client profile data prior to initiating the coupling between the computing device and the remote content server.

4. The method of claim 1, further comprising providing data from the remote content server directly to the output device of the computing device.

5. The method of claim 1, further comprising, while the coupling is inactive, storing metric data corresponding to one or more of provision of the portion of the stored content data and interaction with the portion of the stored content data.

6. The method of claim 5, further comprising transmitting the stored metric data to the remote content server in response to a determination that the coupling is active.

7. The method of claim 6, further comprising encrypting the metric data prior to transmitting the stored metric data.

8. The method of claim 5, further comprising encrypting the metric data.

9. The method of claim 1, wherein the content data is to comprise one or more of:
    advertising data, audio data, image data, video data, and parental control data.

10. An apparatus comprising: a memory to store content data from a remote content server; and a processor to:
    determine whether to store the content data from the remote content server in the memory in response to a determination that an active coupling with the remote content server is available and context information, wherein the context information is to indicate processor utilization and power state; and
    in response to a detection that the active coupling with the remote content server has become unavailable, provide a portion of the stored content data to an output device coupled to the processor,
    wherein the processor is to determine whether to store the content data is performed based on an item selected from a list consisting of: a user cluster, an algorithm cluster, and a publisher/property cluster,
    wherein each cluster is assigned a unique weighting factor that is defined by a policy and contains its own unique set of elements,
    wherein the processor is to determine whether to store the content data is performed based on the publisher/property cluster,
    wherein the publisher/property cluster is to group one or more elements that are dependent on a web property,
    wherein the one or more elements comprise a server response time element corresponding to an expected response time of the remote content server to a request for one or more portions of the content data.

11. The apparatus of claim 10, wherein the processor is to determine whether to store the content data based on client profile data and publisher.

12. The apparatus of claim 10, wherein the processor is to cause storing of metric data corresponding to one or more of provision of the portion of the stored content data or interaction with the portion of the stored content data while the coupling is inactive.

13. The apparatus of claim 12, wherein the processor is to transmit the stored metric data to the remote content server in response to a determination that the coupling is active.

14. The apparatus of claim 13, wherein the metric data is to be encrypted.

15. The apparatus of claim 12, wherein the content data is to comprise one or more of:
    advertising data, audio data, image data, video data, and parental control data.

16. The apparatus of claim 12, wherein the processor is to comprise a plurality of processor cores.

17. A non-transitory computer-readable medium comprising one or more instructions that when executed on a processor configure the processor to perform one or more operations to:
    determine whether to store content data from a remote content server in a local memory of a computing device in response to a determination that the computing device has an active coupling with the remote content server and context information of the computing device, wherein the context information is to indicate processor utilization and power state,
    store the content data in the local memory of the computing device if it is determined to store the content data from the remote content server; and
    in response to a detection that the active coupling with the remote content server has become unavailable, provide a portion of the stored content data to an output device of the computing device,
    wherein the processor is to determine whether to store the content data is performed based on an item selected from a list consisting of: a user cluster, an algorithm cluster, and a publisher/property cluster,
wherein each cluster is assigned a unique weighting factor that is defined by a policy and contains its own unique set of elements,
wherein the processor is to determine whether to store the content data is performed based on the publisher/property cluster,
wherein the publisher/property cluster is to group one or more elements that are dependent on a web property,
wherein the one or more elements comprise a server response time element corresponding to an expected response time of the remote content server to a request for one or more portions of the content data.

18. The computer-readable medium of claim 17, further comprising one or more instructions that when executed on a processor configure the processor to determine whether to store the content data based on client profile data corresponding to the computing device and publisher.

19. The computer-readable medium of claim 18, further comprising one or more instructions that when executed on a processor configure the processor to generate the client profile data prior to initiating the coupling between the computing device and the remote content server.

20. The computer-readable medium of claim 17, further comprising one or more instructions that when executed on a processor configure the processor to provide data from the remote content server directly to the output device of the computing device.

21. The computer-readable medium of claim 17, further comprising one or more instructions that when executed on a processor configure the processor to store, while the coupling is inactive, metric data corresponding to one or more of: provision of the portion of the stored content data and interaction with the portion of the stored content data.

22. The computer-readable medium of claim 21, further comprising one or more instructions that when executed on a processor configure the processor to transmit the stored metric data to the remote content server in response to a determination that the coupling is active.

23. The computer-readable medium of claim 17, wherein the content data is to comprise one or more of: advertising data, audio data, image data, video data, and parental control data.

24. A system comprising: a non-volatile memory to store content data from a remote content server; and a processor to:
determine whether to store the content data from the remote content server in the memory in response to a determination that an active coupling with the remote content server is available and context information, wherein the context information is to indicate processor utilization and power state; and
in response to a detection that the active coupling with the remote content server has become unavailable, provide a portion of the stored content data to an output device coupled to the processor,
wherein the processor is to determine whether to store the content data is performed based on an item selected from a list consisting of: a user cluster, an algorithm cluster, and a publisher/property cluster,
wherein each cluster is assigned a unique weighting factor that is defined by a policy and contains its own unique set of elements,
wherein the processor is to determine whether to store the content data is performed based on the publisher/property cluster,
wherein the publisher/property cluster is to group one or more elements that are dependent on a web property,
wherein the one or more elements comprise a server response time element corresponding to an expected response time of the remote content server to a request for one or more portions of the content data.

25. The system of claim 24, wherein the processor is to determine whether to store the content data d based on client profile data and publisher.

26. The system of claim 24, wherein the processor is to cause storing, while the coupling is inactive, metric data corresponding to one or more of: interaction with the portion of the stored content data and provision of the portion of the stored content data.

27. The system of claim 26, wherein the processor is to transmit the stored metric data to the remote content server in response to a determination that the coupling is active.

28. The system of claim 26, wherein the processor is to cause encryption of the metric data.

29. The system of claim 24, wherein the content data is to comprise one or more of:
advertising data, audio data, image data, video data, and parental control data.

30. The system of claim 24, wherein the processor is to comprise a plurality of processor cores.

31. The method of claim 1, wherein the plurality of elements that are dependent on the web property are to comprise one or more of: a priority and one or more expired elements.

32. The method of claim 1, wherein determining whether to store the content data is performed based on an auction performed between a plurality of remote content servers.

33. The method of claim 1, wherein the one or more elements comprise an element size corresponding to an average size of all elements fetched from the remote content server in a single transaction.

* * * * *

UNITED STATES PATENT AND TRADEMARK OFFICE
CERTIFICATE OF CORRECTION

| | | |
|---|---|---|
| PATENT NO. | : 8,621,046 B2 | Page 1 of 1 |
| APPLICATION NO. | : 12/647463 | |
| DATED | : December 31, 2013 | |
| INVENTOR(S) | : Mahamood Hussain et al. | |

It is certified that error appears in the above-identified patent and that said Letters Patent is hereby corrected as shown below:

In the Claims

In column 13, line 55, in claim 5, delete "of" and insert -- of: --, therefor.

In column 14, line 58, in claim 17, delete "state," and insert -- state; --, therefor.

In column 16, line 23, in claim 25, delete "data d" and insert -- data --, therefor.

Signed and Sealed this
Seventeenth Day of June, 2014

Michelle K. Lee
*Deputy Director of the United States Patent and Trademark Office*